(12) United States Patent
Garrison

(10) Patent No.: US 7,917,842 B2
(45) Date of Patent: Mar. 29, 2011

(54) SYSTEM FOR DESCRIBING THE OVERLAYING OF ELECTRONIC DATA ONTO AN ELECTRONIC IMAGE

(75) Inventor: Jonathan Garrison, Portland, OR (US)

(73) Assignee: CollegeNet, Inc., Portland, OR (US)

( * ) Notice: Subject to any disclaimer, the term of this patent is extended or adjusted under 35 U.S.C. 154(b) by 1037 days.

(21) Appl. No.: 11/053,776

(22) Filed: Feb. 9, 2005

(65) Prior Publication Data

US 2005/0268217 A1    Dec. 1, 2005

Related U.S. Application Data

(60) Provisional application No. 60/574,750, filed on May 27, 2004.

(51) Int. Cl.
*G06N 3/00* (2006.01)
(52) U.S. Cl. .......................... 715/224; 715/221
(58) Field of Classification Search .................. 715/505, 715/507, 508, 817, 820, 234, 244, 254, 243, 715/221, 224
See application file for complete search history.

(56) References Cited

U.S. PATENT DOCUMENTS

| | | | | |
|---|---|---|---|---|
| 5,878,198 A * | 3/1999 | Yuasa et al. | .................. | 358/1.18 |
| 6,651,217 B1 * | 11/2003 | Kennedy et al. | .............. | 715/507 |
| 6,976,227 B2 * | 12/2005 | Kunz | ............................. | 715/825 |
| 7,469,270 B1 * | 12/2008 | Kirkpatrick et al. | .......... | 709/206 |
| 2004/0205534 A1 * | 10/2004 | Koelle | ........................... | 715/507 |
| 2006/0111959 A1 * | 5/2006 | Tarr et al. | ........................ | 705/10 |

OTHER PUBLICATIONS

Hegaret et al., "What is the Document Object Model?," Nov. 13, 2000, pp. 1-7.*
Harvey, Greg, "Adobe(r) Acrobat(r) 6 PDF for Dummies(r)," Wiley Publishing, 2003, pp. 83-84.*

* cited by examiner

*Primary Examiner* — Kyle R Stork
(74) *Attorney, Agent, or Firm* — Michael O. Sheinberg; David Griner; John Kelly

(57) ABSTRACT

In an environment in which some forms are received in paper form and some in electronic form or an environment in which in which workers prefer using paper forms, the invention provides a method of producing a template for the purpose of producing paper forms from electronic forms, the paper forms produced from the electronic forms being similar in appearance to forms that were completed in hard copy. Variable information is extracted from one or more electronic forms that are to be mapped to the paper form. A template is created by placing the variables from the electronic form onto an image of the paper form. The template may include position coordinate information, variable name information, text, and logic. After the template is completed, the system uses the template to print paper forms from instances of electronic forms. In some cases, multiple electronic forms can be mapped to a single paper form, and a preferred system can create a template, even if questions presented in electronic forms vary, depending on answers of previous questions.

20 Claims, 7 Drawing Sheets

FIG. 1

SYSTEM FOR DESCRIBING THE OVERLAYING OF ELECTRONIC DATA ONTO AN ELECTRONIC IMAGE

This application claims priority from U.S. Provisional Patent Application No. 60/574,750 filed on May 27, 2004, which is hereby incorporated by reference. The present invention relates to combining electronic data with an electronic image and, in particular, to creating paper forms from electronic forms.

BACKGROUND OF THE INVENTION

Data that has been traditionally collected by way of paper forms is now often collected electronically. For example, data can be collected from on-line forms through the World Wide Web or data can be extracted from existing databases. Applicants for most colleges now have the option of either completing an on-line application form or completing a paper form. In a mixed environment of electronic and paper forms, or even in an all electronic environment, many of the steps for processing forms are still oriented toward paper forms. While electronic forms can be printed, a typical electronic form printout does not resemble the paper form from which it was derived.

It is sometimes necessary to take data that was entered on an electronic form or that originated in an electronic database, and produce from the electronic data a printout that is similar or identical in appearance to an existing paper form. College admission committees, for example, still meet to read and discuss the paper applications. In order to avoid changing their application review procedures, or to minimize bias in the evaluation process between paper and electronic forms, the institutions often require that the electronic forms be printed in a format that appears very similar to their pre-existing paper forms.

Even in cases in which a person completes a paper form, the receiving institution may want to store the form electronically. The institution could scan the completed form and save an image of the paper form. Electronic images of the completed paper form, however, are less useful than an electronic form because the image of answers entered by the user is not as readily available for data processing as the text or user selections entered on an electronic form. It would be preferable to convert the information entered on the paper form to non-image data, for example, by having someone keyboard the answers on the form or by using optical character recognition to determine the characters entered on the form by the user. The data would then be available for processing, and when the institution wants to view the form, it can be reproduced from the stored data rather than by recalling the image. This process, in effect, converts the paper form into an electronic form.

There are several advantages to storing the information entered on the form as accessible data in an electronic form, rather than storing an image of the paper form. Electronic forms are more easily accessed through a variety of devices, such as handheld or other devices on which it is impractical to display an image of a paper form. Electronic forms can be presented in a variety of ways in order to be accessible to be people with disabilities Also, electronic forms can adaptively display content based on data entered onto the form. For example, the electronic form can be displayed without irrelevant questions, such as questions about immigration status for a non-immigrant.

In the past, the process of creating paper forms printouts from electronic forms was time consuming and required a skilled programmer. The programmer created a template for each form to describe how the data from the electronic form was to be positioned on an image of the paper form, and then a program used the template to print paper forms from instances of the electronic form.

There are several factors that complicate the process of creating paper forms from electronic forms. Because electronic forms are more readily customized than paper forms, sometimes multiple versions of an electronic form are derived from a single paper form. When converting the electronic data back to a paper form, it may be necessary, therefore, to create one paper form that corresponds to several different electronic forms. For example, different graduate schools within a university may each have their own customized electronic admissions form, yet the college may require all the electronic graduate admissions forms to be printed as a single paper form for comparison.

Different electronic forms can use different variable names to represent the same information. When converting to a paper form, the different variable names must be reconciled to print the information in the correct place on the paper form. Another complication is that electronic forms can alter the questions presented based on responses to previous questions, so the same electronic form completed by two different people may have a different number of data fields. Thus, there is not a simple one-to-one mapping of answers in the electronic form to spaces on the paper form. The variation within the same electronic form and between different electronic forms that map to the same paper form, make the mapping process complex.

Electronic forms are composed mostly of labels, variables (that is, place holders for the data collected in individual form questions) and data sets (that is, data that populate questions with a finite set of selectable answers, such as a list of states). The number of questions on a form, in most cases, corresponds to the number of variables that exist in the corresponding electronic form.

To create a paper form from electronic data, a programmer typically uses an electronic representation of the paper form image in, for example, portable document format ("PDF"). Electronic forms are typically written in extensible mark-up language ("XML"). The programmer creates data fields on the PDF image for inserting variables. These data fields serve as a template, describing a region on the PDF image and an associated variable. A program then applies the template to instances of the electronic XML form to put the data into the data fields on the PDF file. Creating the template has been a slow and tedious process, requiring many hours of skilled programming.

The term "paper form" used herein can refer not only to a form that is printed on a piece of paper and that is completed by a form user using a pen, pencil, or typewriter, but also to an electronic image of such a form, as opposed to a print out of a form that is completed on line and that does not resemble such a form.

SUMMARY OF THE INVENTION

An object of the invention is to facilitate the merging of instances of electronic data with an image file.

In accordance with the invention, a user combines an electronic form description file with an image file of a corresponding paper form. For example, the user can create a template for the purpose of converting instances of electronic forms into printable paper forms that have a desired appearance, such as the appearance of an original paper form from which the electronic form was derived.

The system extracts objects from electronic data and provides a list of those objects to the user. The user selects objects from the list and applies them to the image to define the relationship between the electronic data and the image. The user that applies the objects to the image does not need to have the skills of a computer programmer. The defined relationship is then used to combine instances of the electronic data with copies of the image, for example, to print out electronic forms to resemble paper forms.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and the advantages thereof, reference is now made to the following descriptions taken in conjunction with the accompanying drawings, in which:

FIG. 1 shows a computer screen of a system implementing a preferred embodiment of the invention

DETAILED DESCRIPTION OF THE PREFERRED EMBODIMENTS

The system can be used to map electronic form description data onto a paper form or other image. It can be used, for example, to create a template for the purpose of printing electronic forms that look like an original paper form, or simply to enhance the appearance of the printouts of electronic forms. The invention allows an institution to obtain the benefits of electronic forms, while also providing the benefits of paper forms.

In accordance with a preferred embodiment of the invention, a user can create a template for creating instances of paper forms from instances of electronic forms. The system extracts the variables from electronic forms (or other data source or combination of data sources) and provides a list of variables to the user. The user selects variables from the list, and drags and drops them onto an image of the paper form to create fields on the image. The user can also assign properties, operations, or logic to the fields. Once the template is complete, instances of the electronic forms can be processed using the template and then printed as paper forms having a desired appearance, such as the appearance of the original paper form from which the electronic form is derived.

The system creates a searchable database that tracks all the variables from all the electronic sources that map to the single paper form image. When a variable is dropped onto the paper form, the database is searched to locate all variables that contain the same information as the dropped variable, and the system indicates to the user that the variable has been placed, thereby allowing the user to ensure that all variables are placed, and eliminating duplicate placements. In the example described below, the form is an admission application to a university.

Figure 1:
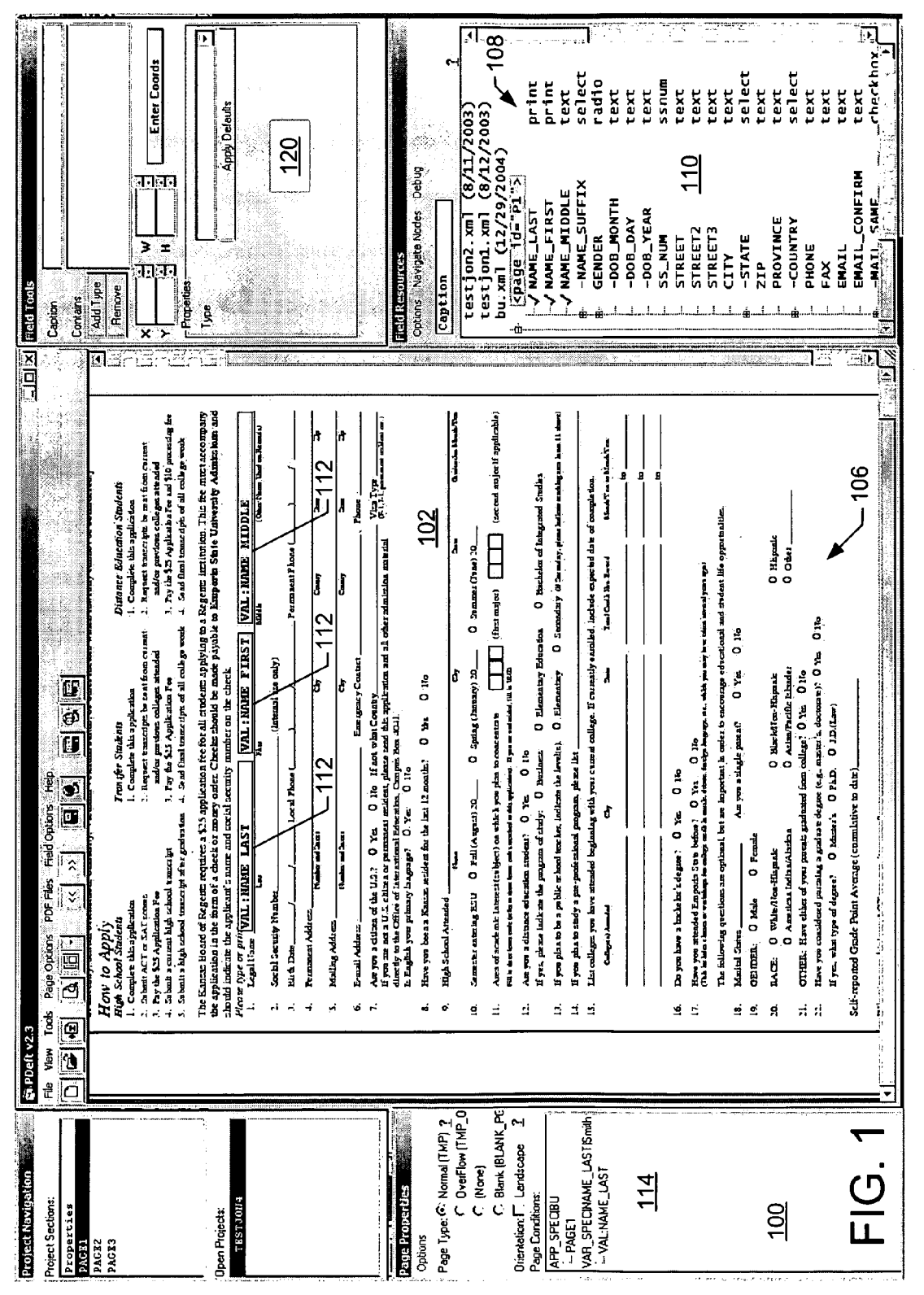
Figure 2:
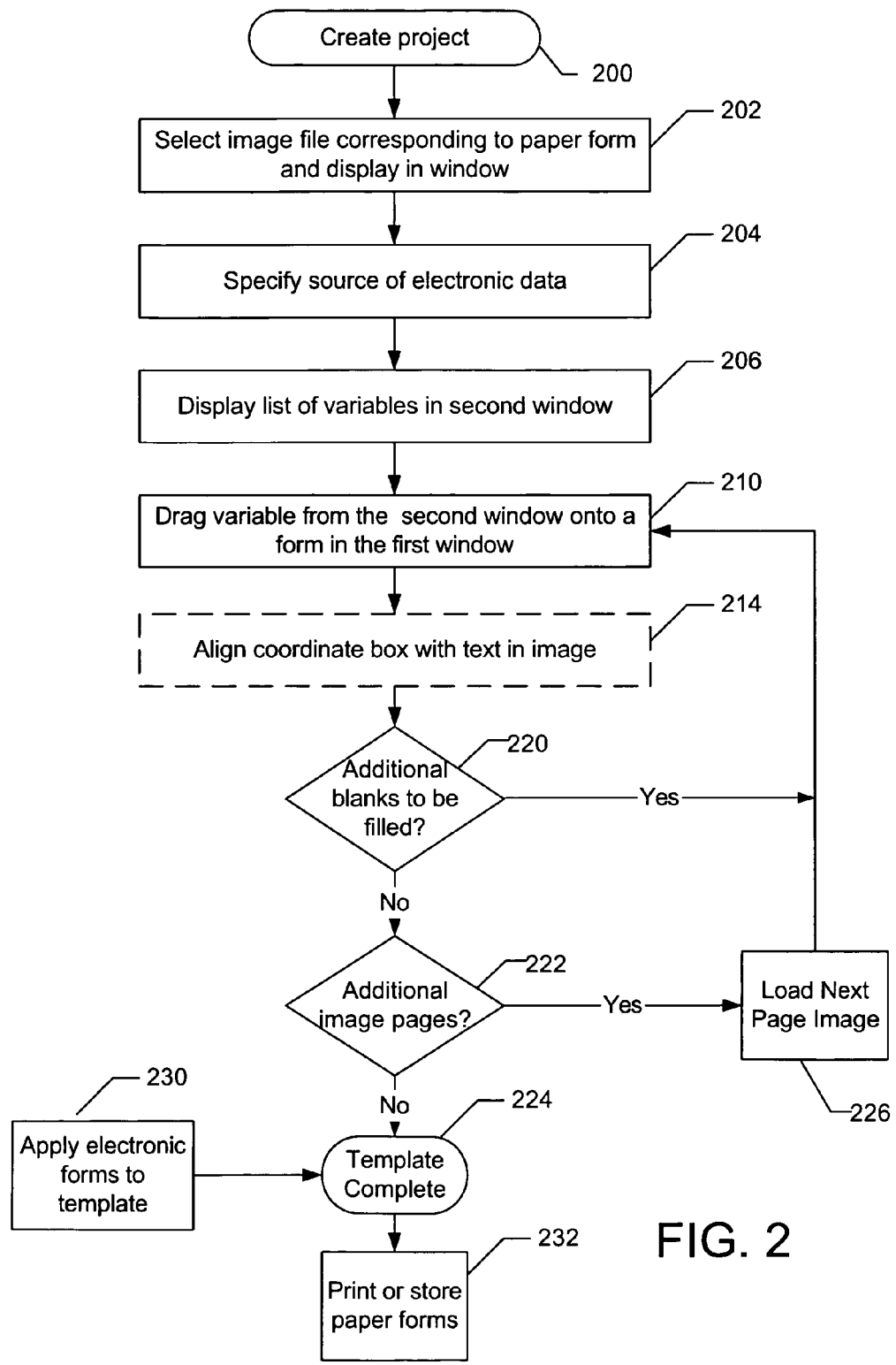
FIG. 2 is a flow chart showing the steps a user typically performs while using a preferred embodiment of the invention.

FIG. 1 shows a computer screen image 100 from a system implementing an embodiment of the present invention. FIG. 2 is a flow chart showing the steps a user follows to create paper forms corresponding to electronic forms in accordance with an embodiment the present invention.

In step 200, a user opens the design environment and creates a new project corresponding to one or more electronic data sources, such as electronic forms, and an associated paper form. The system software confirms that the project name is not a duplicate of an existing project, and creates a new directory named for the project. In step 202, a paper form image file is selected, and an electronic paper form image 106 corresponding to the paper form image file is displayed in a window 102. Paper form image 106 is typically derived from a file provided by the form recipient, such as the university to which the application form is directed. The paper form image file could be, for example, in PDF format, Post Script ("PS") format, or Quark format.

In step 204, the user specifies the source or sources of the electronic form description data. For example, the user typically selects one or more electronic forms that are to be combined with the selected paper form. Multiple electronic forms corresponding to a single paper form are used, for example, by a university in which each graduate school has its own customized electronic application form, but the university desires to have a single paper form format derived from the multiple electronic forms.

In step 206, the system displays a list 108 of variables and possible known values of some of those variables used in the electronic forms in a second window 110. Some of the variables in window 110 can be derived from sources other than the electronic forms. For example, dates for individual academic terms may be derived from a file that is maintained by the university, rather than from information on a form. Variables can be of various types, such as TEXT, VALUE, DATE, ESSAY, CHECK BOX, etc. The variable type is determined from the type of the corresponding field in the electronic data.

In step 210, a user drags a variable object from list 108 and drops it onto form image 106 to define a field 112. In optional step 214, the software automatically aligns the field with text or an underscore, if any, on the paper form image so that when a paper copy of the form is printed, the data will properly align with the writing on the form. For example, FIG. 1 shows that the variables NAME_LAST, NAME_FIRST and MIDDLE were dropped onto line 1 of paper form image 102 and aligned with the underscore.

Window 120 displays information regarding a defined coordinate region or field that is overlayed onto form image 102. A field does not necessarily contain a variable. It can also contain, for example, a text message. Window 120 shows the caption or name of the coordinate area, its position, width, height and the type of variable that is assigned to that area. Window 120 also shows the name of the variable that was assigned to the field, and properties, such as font size, that describe how the variable is to be displayed. The user can alter the properties in window 120 to make the data print appropriately in the outputted paper form.

Figure 6:
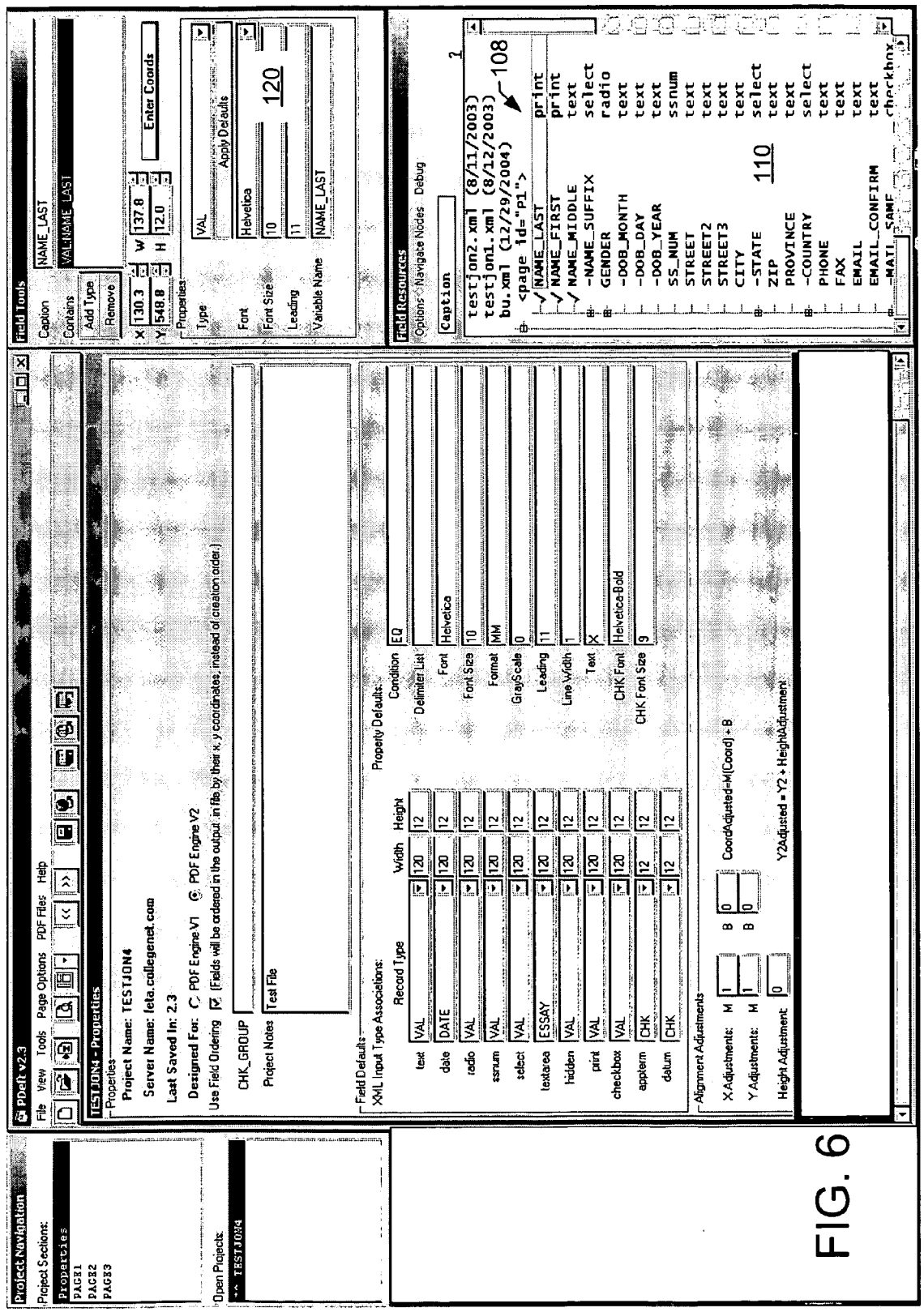
FIG. 6 shows another computer screen of a system implementing a preferred embodiment of the invention, the screen showing properties of objects.

The screen in FIG. 6 allows a user to set default states for fields of specified types. In this way, variables that are dropped on to the form image start off with the most appropriate property settings based on the type of field in the source form. The properties assigned to a field can include conditional logic that specifies action to be taken if the variable has a specified value in an instance of an electronic form being processed. For example, if a student enters "Yes" to a question that requires an explanation on an additional sheet, the additional sheet is generated. The logic could also define an operation that is applied after the template is melded with the electronic data. For example, the logic could indicate that the information is to be transformed to upper case letters.

Decision step 220 asks whether all the blanks on the displayed page of the paper form have been assigned variables from variable list 108. If so, the process of creating the template for that page is complete. If not, the user repeats step 210 and drags another variable onto the page form image, continuing until the entire page is laid out. If it is determined in a decision block 222 that there are additional pages of the paper form, the image of the next page is loaded in step 226, and the process continues in step 210 with adding fields to the image.

After all the blanks on all the pages of the paper form are completed, step 224 indicates that the template creation process is complete. In step 230, other software combines completed instances of the electronic forms with the template to produce paper forms, which are printed or stored in step 232.

Using the invention, a person who is not a skilled programmer can create a template in a fraction of the time previously required for a programmer to program a template, and once the template is created, the actual converting from an electronic form to a paper form requires no additional design of programming effort and can be performed automatically or by a relatively unskilled person. Multiple electronic forms can be associated with a single template for mapping to the same paper form. Logic within the template can cause changes. For example, one or more extra pages may be created or one or more pages may be removed.

Figure 3:
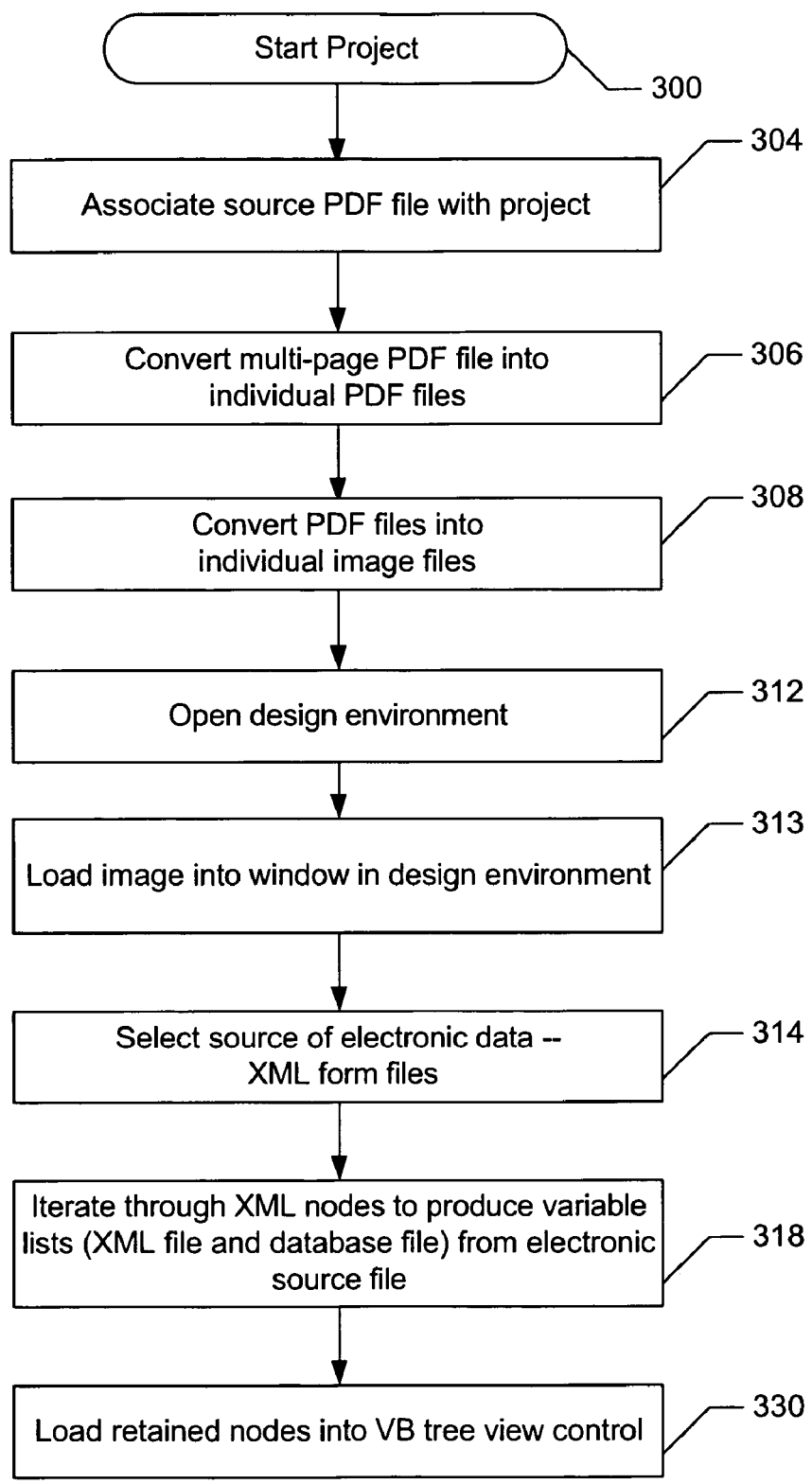
FIG. 3 is a flow chart showing the steps performed by a preferred embodiment of the software to prepare for a user to begin mapping electronic data to a paper form.
Figure 4:
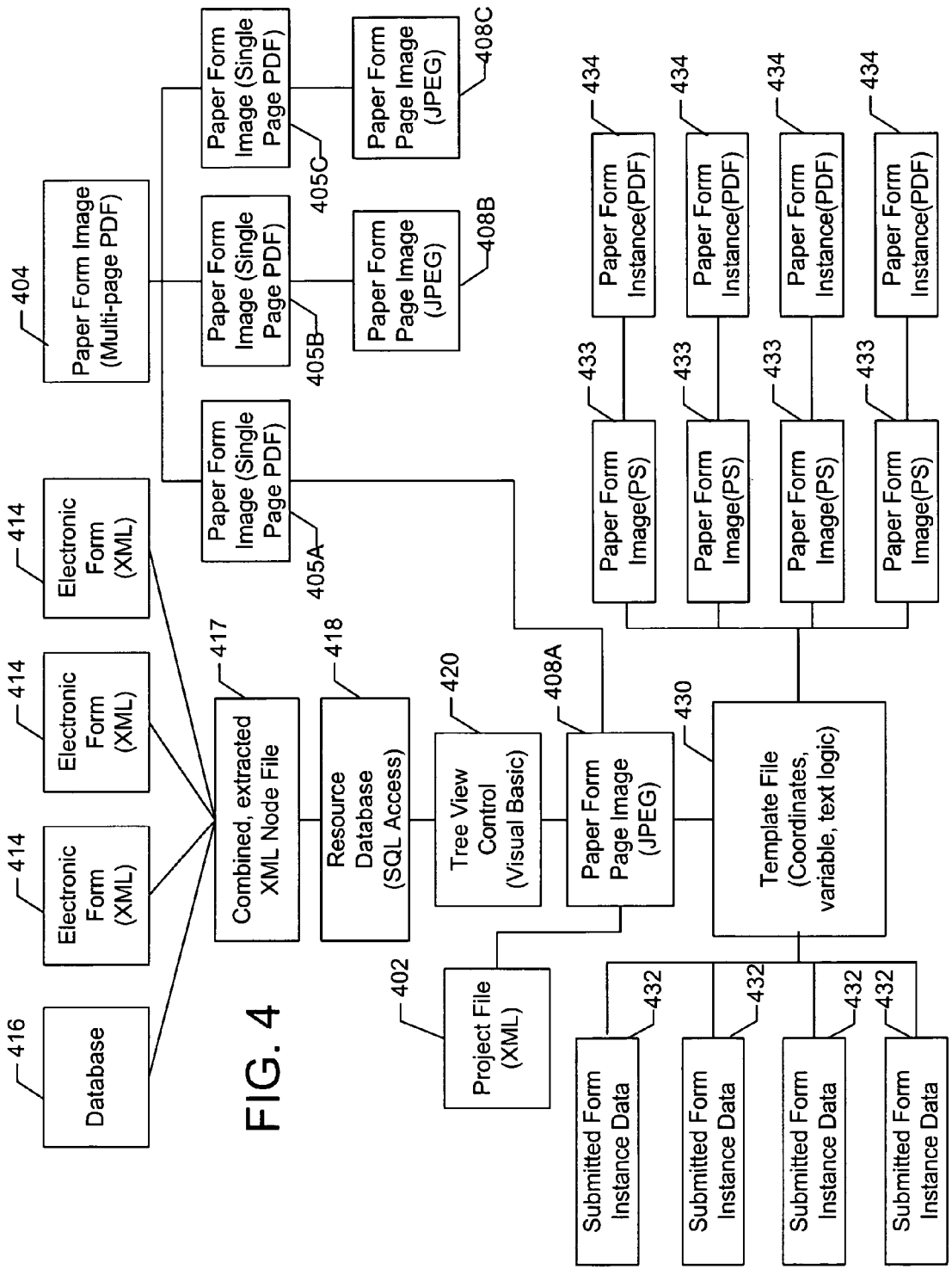
FIG. 4 is a block diagram showing the relationship between the various files used with the steps shown in FIG. 3.

FIG. 3 shows in detail the steps performed by a preferred system as the user performs steps 200 through 206 of FIG. 2. FIG. 4 shows schematically various data representations that are used in a preferred implementation of the invention. In step 300, an XML project file 402 is started by running Perl scripts to make sure the new project name does not collide with an existing project name, and a new directory is created from the project. In step 304, a paper form image file 404, such as a multi-page PDF file, is associated with the project. The form image file 404 is typically received from the form recipient, that is, the institution to which the form is directed. In step 306, multi-page paper form image PDF file 404 is split into separate, individual page PDF files. For example, a three page multi-page paper form image PDF file 404 would be broken into single page PDF files 405A, 405B, and 405C, each of which is then converted in step 308 to an individual page image file 408A, 408B, and 408C, respectively. Individual page image files 408A, 408B, and 408C can be, for example, in JPEG file format. Although FIG. 4 shows file 408A being processed and files 408B and 408C off to the side, it will be understood that after processing of file 408A is complete, files 408B and 408C will in turn be placed in the position shown for file 408A.

Because of variations in the quality of PDF file assembly, in some cases it is preferable to obtain a paper form file from the form recipient in its original format, such as Quark format, and then create the PDF file. These image files pages are then used as the background onto which the variable data from the electronic forms will be entered.

In step 312, the program opens a design environment. In step 313, the system loads the JPEG image of the first page 408A into memory and displays the page as the background in a window in the design environment. The software uses the multiple document interface ("MDI") so multiple documents can be displayed simultaneously in different windows on the screen.

In step 314, the user selects the source of the electronic data that are to be mapped to the selected paper form or other image. Typically sources include electronic forms 414 in XML format. Another source could be a database 416. The system preferably allows multiple electronic forms or other data sources to be mapped onto a single paper form image.

Figure 7:
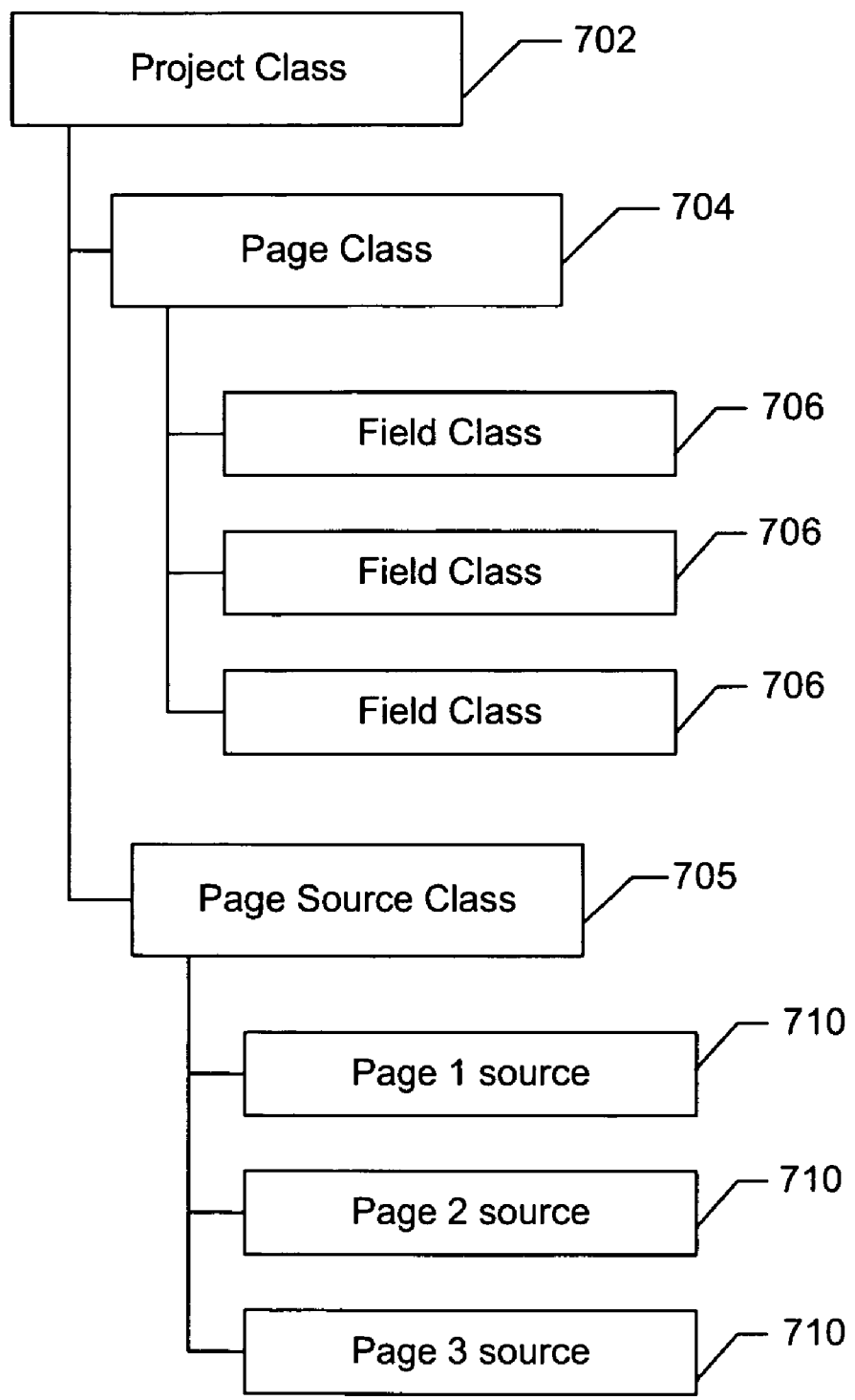
FIG. 7 shows the class hierarchy structure of objects in a preferred embodiment.

XML electronic forms typically include HTML formatting codes and data designated by XML tags. Data in the XML form files are organized in hierarchies. FIG. 7 shows that the data is preferably organized in an object-oriented, hierarchical manner. A project class 702 includes a class object that contains all the data for the project. Within the project class 702 are individual page classes 704 and within the page classes are field classes 706. Each of the physical representations on the paper form image is a field. Each field can have multiple records, with the record being basically a description of the variable name. For example, a "NAME" field could have two records, NAME_LAST and NAME_FIRST. A record can be of various types, such as a value, a message, an essay, a check box, etc. A page source class 705 includes source files used to create the background. Underneath the page source class 705 are additional classes for each page. Instances of the page source objects are stored in PDF format, with the PDF base 64 encoded and stored in an XML file.

To produce the variable list, the program checks each node of the hierarchy to determine how to handle that node. The nodes are examined recursively in step 318 until every node in the file has been explored. Either the node is found to contain information that may be required on the paper form, in which case the node is retained for use in the project, or the node is found to contain only unnecessary formatting information for the electronic form, in which case the node is discarded. In some cases, a retained node is modified. For example, a node containing a Select Box containing a list of states could be modified to refer to a list of states already existing in the project. A visual basic program or script can be used to iterate through the XML nodes, using XML Path language ("XPATH"), a language for addressing parts of an XML document, to access and modify the XML data. The XML nodes that are not discarded are stored in a combined XML listing file 417 and also in a resource database 418, which is created to store the retained data. The result of the iteration is a single list, stored in two different data representations, of all of the variables in all the electronic data sources that will map to the paper form. Other types of files, such as a tab-delimited file, can be readily converted to XML files and so almost any type of data could be used as the source of electronic data.

When the data is processed, the nodes that are not discarded are loaded from the resource data 418 into a Visual Basic ("VB") tree view control 420 in step 330. The VB tree view control 420 is a method of describing hierarchical data, and the data is displayed in a hierarchical fashion. For example, FIG. 1 shows in pane 114 various variable nodes that are owned by a page node. For each variable or node, two representations are maintained: one representation in resource database 418, which displays data shown in window 108 using tree view control 420 and one representation in XML project file 402 operating behind the display and including an XML node for each node displayed in the tree view control.

There is typically not a one-to-one relationship between the variables in tree view control 420 and the fields on the paper form. Variable names may be present on more than one XML source form or may be present more than once on a single XML form and would therefore be include more than a single instance in tree view control 420. For example, a common variable such as "NAME_LAST" may appear on six different forms and as a header on the top of each page of a single form. A node exists in the tree view control for each occurrence of the variable in any of the electronic data sources.

Figure 5:
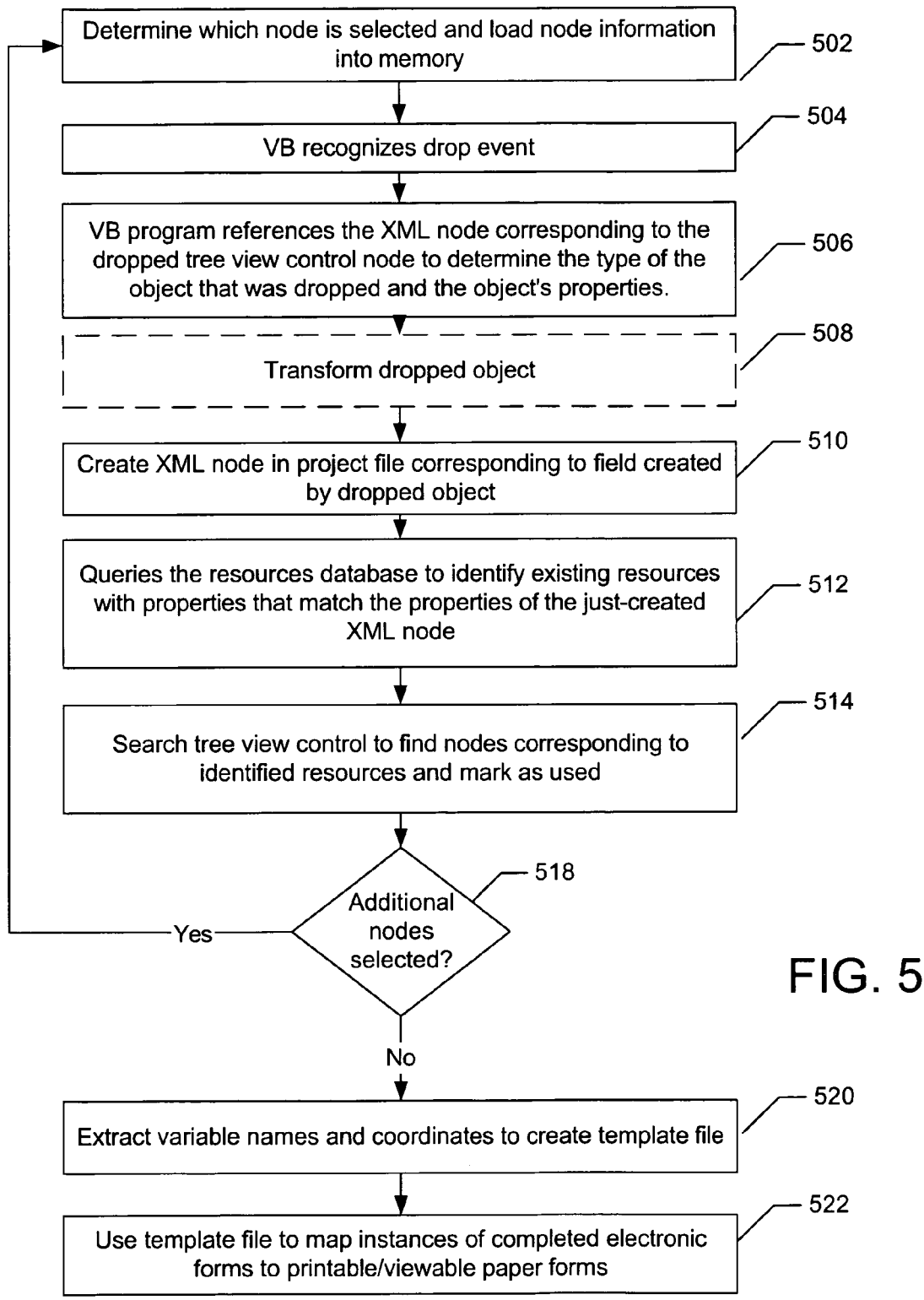
FIG. 5 is a flow chart showing the steps performed by a preferred embodiment of the software as a user maps electronic data to a paper form.

FIG. 5 shows the steps that the system performs as the user begins to assemble the template. When a user clicks on a node in the tree view representation of list 108, the program determines in step 502 which node was clicked on and converts the underlying xml data node into a node that is ready to be moved into the template file 430.

When the user drags an item from the tree view control in window 108 and drops the item onto the paper form image 106, a VB program recognizes in step 504 that the event occurred and creates a field on the image. In step 506, the VB program references the XML node in XML node file 417 corresponding to the dropped tree view control node to determine the type of the object that was dropped and the properties of the object. For example, if the XML node indicated that object dropped was text, the program may create a "Value"-type field in the paper form object to accept and display the text. In optional step 508, the program also performs any transformations required to make the dropped object appropriate for inserting onto the paper form image. For example, the transformation may be based on default settings, specified using the screen shown in FIG. 6, that specify the conversion of a specified type of field in the source XML file 414 to a particular type of field in the template file 430. For example, a "text" field in the source xml file might be transformed to become a "value" type field in the template file. The dropped object is typically indicated on the paper form image by a rectangular coordinate square, which represents a field on the image.

In step 510, a new XML node is created to represent the field in the project file 402 when the node from the tree view control is dragged onto the page. Because the same information can occur multiple times in the source electronic forms or even within one source electronic form file, it is necessary to keep track of what information has been placed in fields on the image. Various factors, such as different variable names being used for the same information or the same variable names being used for different information makes this tracking complex.

In step 512, the program queries the resources database 418 using a structured query language ("SQL") to determine whether there are any existing resources with properties that match the properties of the just-created XML node in the project file 402. In step 514, the tree view control is searched to find nodes corresponding to resources located in step 512, and those nodes are marked, for example, with a check box, to indicate that those resources have been mapped.

For example, when the node "BIRTHDATE" is dragged onto the form image, the resource database 418 is queried to determine whether it contains any fields having birth date information. In some cases, multiple resources including birth date information are identified. The different resources may have originated from different electronic sources, such as, different electronic forms or databases or from multiple occurrences of a variable on a single form. The tree view control is then searched to identify the nodes that correspond to the located database resources. A checkmark is placed in the tree view control next to the nodes identified. Thus the program allows the user to keep track of what information has been mapped, even if the information occurs multiple times in the data sources.

For example, "NAME_LAST" may be present as a header on the top of each of five pages of an XML source form. There would then be five nodes in the resource database 418 and five nodes in the tree view control 420 for the same variable. When the database was queried, each of the five nodes would be located and the ID's of each node would be returned. Each of the five nodes would then be checked in the tree view control.

Some form questions provide a drop-down box with answers selectable from a finite set of answers. The selectable answers are referred to as "data sets." Different questions on the same form can use the same data set, but the item selected may be different. For example, a data set of "States" may be used in questions about "State of Birth" and "State of Residence." Each instance of the dataset is listed in the tree view control 420 and in the resource database 418. When "States" is dropped onto the paper form image as a variable for a question about state of birth, the system must place a check mark by the appropriate node in the tree view control, and not by other questions that also used an instance of the "States" dataset.

More than one variable may be placed in a single region of the form. This is useful, for example, when a template maps multiple electronic forms onto the same paper form. Different electronic forms might use different variable names to correspond to the same information on the output paper form. When two variable names are positioned at a single region, the variable names should be mutually exclusive, that is, no form should ever include values for both variables, so that only a single value prints on the paper form.

Logical operations defined by the user can be page level logic, multiple field level logic, or record level logic within the field. Page level logic, for example, controls which pages are to appear. For example, one or more overflow pages may be required to accommodate an essay answer, which can have a variable length. It is also possible to drag onto the form image validation logic and criteria for fields. One type of conditional logic specifies that when a variable has a certain value, various other fields are to be displayed. The other fields can be specified by dragging the fields into the window in which the logic is being specified. The mapping process is repeated for each page of paper form 404, e.g., 405B and 405C of the paper form.

After it is determined in step 518 that the entire paper file is mapped and no additional nodes are selected, the software takes the XML project document 602 and in step 520 extracts the names and coordinates of the data fields on the image file. The coordinates, variable names, and other nodes are put into a template file 430. The template file can be used to map any instance of the originally selected electronic forms to the paper form image for viewing or printing. In step 522, software then takes instances of the electronic forms 432 and, using template file 430, merges the electronic files 432 with a post script file 433 corresponding to the original PDF document to create printable paper forms PDF 434 corresponding to the electronic forms. The system could also produce an XML file as the output for use in creating the paper form from instances of the electronic form.

The combined, extracted XML node file 417, the paper image files 405A, 405B, and 405C, and the template file 430 are stored in the XML project file 402. Image files 405A, 405B, and 405C are stored in base 64 encoding. A user therefore need only keep track of a single project file. When the project is reopened, the resource database 418 and tree view control 420 are regenerated from the combined, extracted XML node file 417, the paper image files 405A, 405B, and 405C.

To summarize, each page is mapped and scripts generate instructions corresponding to each page. The instructions are maintained in a template file. The PDF file is converted to a PS file for convenience, and the PS file is saved in a directory. When a printout of a form is requested, the software that performs step 522 opens a PS file and adds PS instructions from the instruction file telling it where to put each variable. The process is repeated for the subsequent pages until the entire form is done. The PS file is then converted back to PDF and printed.

The invention can be implemented on a computer workstation or a general purpose computer. Computer instructions for implementing the invention can be stored on computer readable media such as optical media, magnetic media, and non-volatile or volatile memory. For steps that involve an action by user, the computer instruction may prompt for and accept such input.

The invention is not limited to forms processing and can be used in any application to combine electronic form description data comprising variables with image data. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method of producing a template for producing a printout of a paper form from an electronic form, comprising:
   a. displaying an image of the paper form in a window on a computer screen;
   b. providing an electronic form including xml code;
   c. iterating through the xml code to extract a list of variables;
   d. storing the extracted variables;
   e. displaying the extracted variables;
   f. selecting a variable from the displayed extracted variables and positioning a representation of the selected variable onto the image of the paper form;
   g. identifying corresponding variables storing the same information as the selected variable;
   h. marking the selected variable and the corresponding displayed variables to indicate that the information associated with these variables has been added to the image;
   i. storing in a template file identification information about the selected variable and position information describing where the variable was added, the template file being available for automatically converting completed instances of the electronic form into paper forms;
   j. retrieving multiple completed instances of the electronic form, said completed forms having information associated with the variables on the electronic form;
   k. merging the information from each completed electronic form with the template file to create a printable form corresponding to each electronic form; and
   l. printing the forms.

2. The method of claim 1 in which storing the variables includes storing multiple representations of at least some of the variables.

3. The method of claim 2 in which in storing multiple representations of at least some of the variables includes storing at least some of the variables in an xml file and in an sql searchable database.

4. The method of claim 3 in which identifying corresponding variables storing the same information as the selected variable includes searching the database using a structured query language to identify the corresponding variables.

5. The method of claim 1 in which displaying the variables includes displaying the variables in a hierarchical arrangement.

6. The method of claim 1 in which storing in a template file identification information about the selected variable and position information describing where the variable was added includes storing the identification and position information in an XML file.

7. The method of claim 1 further comprising providing a second electronic form including xml code and in which iterating though the xml code to extract a list of variables includes extracting a list of variables corresponding to the variables in both electronic forms.

8. The method of claim 1 in which selecting a variable from the displayed variables and adding it to the image of the paper form includes defining logic that changes the appearance of the paper forms depending on the value of one or more of the variables.

9. The method of claim 1 in which storing in a template file identification information about the selected variable and position information describing where the variable was added includes embedding logic in the template, the logic describing how sections of the paper forms should be adaptively displayed based on the values of the variables.

10. One or more computer-readable media having computer-readable instructions thereon which, when executed by a computer, implement the method of claim 1.

11. A method of producing a template for producing a printout of a paper form from an electronic form, comprising:
   displaying an image of the paper form in a window on a computer screen;
   extracting a list of variables from one or more electronic forms and displaying the list of variables in a window on the computer screen;
   selecting variables from the list of variables and positioning a representation of the selected variables onto the image of the paper form; and
   producing a template file including the selected variable names and positions of selected variable names on the image of the paper form, the template file including information for automated processing of multiple data sets corresponding to one or more electronic forms by printing images of the paper form with the data from the data set placed in accordance with the information in the template file.

12. The method of claim 11 in which extracting a list of variables from an electronic form includes assigning hierarchical information about the variable and in which displaying the list of variables includes displaying the variables in a hierarchy.

13. The method of claim 11 in which displaying an image of a paper form includes converting a multi-page PDF form into multiple single page PDF forms and converting each of the multiple single page PDF forms into an image format for displaying on the computer screen.

14. The method of claim 11 in which extracting a list of variables includes storing the variables in a database and in which displaying a list of variables includes searching the database to locate a variable that was placed on the paper form image and other variables storing the same information and indicating on the display that that variable and the other variables have been placed.

15. The method of claim 11 in which extracting a list of variables from one or more electronic forms includes extracting a list of variables from multiple electronic forms that are directed to different areas within a single institution.

16. The method of claim 11 further comprising embedding logic in the template, the logic describing how sections of the paper forms should be adaptively displayed based on the values of the variables.

17. The method of claim 16 in which the values of variables displayed in first sections of the paper forms determine how second sections of the paper forms should be displayed.

18. The method of claim 11 in which in extracting a list of variables includes storing multiple representations of at least some of the extracted variables.

19. The method of claim 18 in which multiple representations of at least some of the extracted variables includes storing at least some of the variables in an xml file and in an sql searchable database.

20. The method of claim 11 in which storing the variables includes storing multiple representations of at least some of the variables.

* * * * *